United States Patent [19]

Altmann et al.

[11] Patent Number: 4,540,536

[45] Date of Patent: Sep. 10, 1985

[54] METHOD OF MANUFACTURING TRANSFORMER WINDINGS EMBEDDED IN CASTING RESIN

[75] Inventors: Gerhard Altmann, Kirchheim; Wolfgang Bendel, Leonberg; Rudolf Dedelmahr, Aischtal; Richard Pfeiffer, Stein-Deutenbach, all of Fed. Rep. of Germany

[73] Assignee: Transformatoren Union Aktiengesellschaft, Stuttgart, Fed. Rep. of Germany

[21] Appl. No.: 531,778

[22] Filed: Sep. 13, 1983

[30] Foreign Application Priority Data

Sep. 14, 1982 [DE] Fed. Rep. of Germany ....... 3234098

[51] Int. Cl.[3] .............................................. B29C 6/02

[52] U.S. Cl. ...................................... 264/102; 249/91; 249/157; 249/178; 264/258; 264/272.13; 264/272.15; 264/272.19; 264/316; 264/338

[58] Field of Search ...................... 264/272.19, 272.15, 264/272.13, 102, 258, 316, 338; 249/91, 157, 178; 29/606

[56] References Cited

U.S. PATENT DOCUMENTS

| | | | |
|---|---|---|---|
| 1,281,258 | 10/1918 | Alexander | 249/178 |
| 2,856,639 | 10/1958 | Forrest et al. | 264/272.19 |
| 2,925,570 | 2/1960 | Strock | 264/272.19 |
| 2,937,408 | 5/1960 | Limpel | 264/272.13 |
| 3,041,562 | 6/1962 | Gammel, Sr. | 264/272.19 |
| 3,046,604 | 7/1962 | Graham et al. | 249/91 |
| 3,084,390 | 4/1963 | Anderson | 264/272.19 |
| 3,084,418 | 4/1963 | Procopio | 29/606 |

FOREIGN PATENT DOCUMENTS

| | | | |
|---|---|---|---|
| 1290787 | 12/1962 | France | 29/606 |

*Primary Examiner*—James Lowe

*Attorney, Agent, or Firm*—Herbert L. Lerner; Laurence A. Greenberg

[57] ABSTRACT

Method of manufacturing a transformer winding embedded in casting resin by winding coils respectively by themselves and independently of one another for disposition thereof in tandem in axial direction of the winding includes placing the wound coils in a substantially annular casting mold having an inner and an outer jacket, with respective impregnated corrugated mats of insulating material as spacers disposed between the inner jacket and the coils as well as between the coils and the outer jacket, the inner and the outer jackets being fixed between mold end walls at respective ends of the casting mold; and disposing the casting mold containing the wound coils in an evacuated chamber and pouring casting resin into the casting mold through an axially parallel slot formed in the outer jacket thereof. Additionally included are spreading the inner jacket in radial direction so as to permanently deform the inner spacer to a dimension at which the radial extent of the inner spacer is reduced, the inner jacket being formed with axially parallel edges at ends thereof overlapping in circumferential direction and slidable on one another during the deformation so as to spread the inner jacket in radial direction; fixing the coils of the winding on the inner spacer against movement in axial direction; and surrounding respective edges at the ends of the inner and the outer jackets with an elastic layer at the inner face of the respective mold end walls.

11 Claims, 2 Drawing Figures

METHOD OF MANUFACTURING TRANSFORMER WINDINGS EMBEDDED IN CASTING RESIN

BACKGROUND OF THE INVENTION

1. Field of the Invention

The invention relates to a method of manufacturing transformer windings embedded in casting resin and, more particularly, to such transformer windings embedded in casting resin by winding coils respectively by themselves and independently of one another for disposition thereof in tandem in axial direction of the winding; placing the wound coils in a substantially annular casting mold having an inner and an outer jacket, with respective impregnated corrugated mats of insulating material as spacers disposed between the inner jacket and the coils as well as between the coils and the outer jacket, the inner and the outer jackets being fixed between mold end walls at respective ends of the casting mold; disposing the casting mold containing the wound coils in an evacuated chamber and pouring casting resin into the casting mold through an axially parallel slot formed in the outer jacket thereof; and permitting the casting resin to harden at least partly in the mold at elevated temperatures and at a pressure at least equal to atmospheric pressure.

With increasing use of casting resin transformers, the optimization, especially, of the casting resin which is used becomes increasingly important economically. For this reason, equally good utilization of the advantageous electrical and mechanical properties of the casting resin plastic is sought after, possibly smaller wall thicknesses of the casting resin body additionally offering considerable thermal advantages.

2. Description of the Prior Art

From European Patent Application No. 80 108 131, published July 8, 1981, a method of manufacturing windings for electrical equipment, the windings being embedded in casting resin, has become known heretofore, according to which, impregnated corrugated mats formed of insulating material serve as spacers for fixing the electrical equipment parts to be encapsulated in the casting mold. These mats of insulating material, which remain in the cast-resin body, simultaneously act as reinforcement for the casting resin plastic material, which increases the mechanical load-carrying capacity of the casting-resin plastic material.

By the aforementioned heretofore known method, windings of coils arranged in tandem in axial direction are also encased by casting, the casting being effected preferably with a mold disposed in a horizontal position in an evacuated chamber, the casting resin compound being through a slot extending parallel to the axis and formed in the outer surface of the casting mold, and the casting resin compound being permitted to set at least partly in the mold itself at elevated temperature and at atmospheric or higher pressure.

To perform the heretofore known method, however, spacers and reinforcement inserts, respectively, in very large numbers and with different dimensions are required, in turn, necessitating the provision of a multiplicity of expensive auxiliary tools for manufacturing them. For practical purposes, only spacers with specific dimensions graduated stepwise are made in order to limit the number of the auxiliary tools required for manufacturing the spacers, so that the electrical and the mechanical load-carrying capacity of the casting resin bodies is frequently not fully utilized.

SUMMARY OF THE INVENTION

It is therefore an object of the invention to provide a method of manufacturing windings embedded in casting resin whereby the good electrical properties of the casting resin body and the mechanical properties thereof improved by inserted reinforcement can be utilized fully.

With the foregoing and other objects in view, there is provided, in accordance with the invention, a method of manufacturing a transformer winding embedded in casting resin by winding coils respectively by themselves and independently of one another for disposition thereof in tandem in axial direction of the winding; placing the wound coils in a substantially annular casting mold having an inner and an outer jacket, with respective impregnated corrugated mats of insulating material as spacers disposed between the inner jacket and the coils as well as between the coils and the outer jacket, the inner and the outer jackets being fixed between mold end walls at respective ends of the casting mold; disposing the casting mold containing the wound coils in an evacuated chamber and pouring casting resin into the casting mold through an axially parallel slot formed in the outer jacket thereof; and permitting the casting resin to harden at least partly in the mold at elevated temperatures and at a pressure at least equal to atmospheric pressure; which includes permanently deforming the inner jacket of the casting mold to a dimension at which the radial extent of the inner space is reduced, the inner jacket being formed with axially parallel edges at ends thereof overlapping in circumferential direction and slidable on one another during the deformation so as to spread the inner jacket in radial direction; fixing the coils of the winding on the inner spacer against movement in axial direction, and surrounding respective edges at the ends of the inner and the outer jackets with an elastic layer at the inner face of the respective mold end walls.

To spread the inner mold jacket, a device according to German Pat. No. 22 11 685, for example, may be used, wherein profiled strips provided on the circumference of a winding core, the diameter of which is adjustable, alter the radial position thereof by moving on pins in slots disposed at an angle inclined to the axial direction.

In accordance with another measure of the invention, the method includes forming the respective spacers of two layers of the mats of insulating material, one of the layers having corrugation folds extending in a direction which is +45° with respect to the axis of the winding, and the other of the layers having corrugation folds extending in a direction −45° with respect to the axis of the winding, so that the corrugation folds of both layers intersect at an angle of 90°.

In accordance with another feature of the invention, the method includes extending the spacers beyond both ends of the winding in axial direction.

In accordance with a further feature of the invention, the method includes inserting bundles of fibers extending in circumferential direction in chambers defined by and between the coils and the spacers while slowly rotating the winding.

In accordance with an additional feature of the invention, the method includes inserting bundles of fibers in the axially parallel corrugations of the spacers for additionally reinforcing the hardened casting resin.

In accordance with an added feature of the invention, the mats are woven or fleece and are formed of glass or synthetic fibers impregnated with pure casting resin.

In accordance with yet another feature of the invention, the method includes impregnating the mats with casting resin only after the non-impregnated mats are first inserted into the casting mold.

In accordance with yet a further feature of the invention the casting resin consists of pure epoxy resin or epoxy resin filled with quartz powder.

In accordance with yet an additional feature of the invention, the method comprises preheating the winding.

In accordance with yet an added feature of the invention, the method comprises sliding the coils over the inner jacket of the casting mold, and drawing the inner spacer from a magazine into the mold between the end edges of the inner jacket overlapping in circumferential direction and into installed position of the inner space while holding the coils fixed and slowly rotating the inner jacket.

The method of manufacturing transformer windings embedded in casting resin according to the invention is very advantageous because it permits adjustment of the especially important and critical wall thickness of the casting-resin casting on the inside of the winding by deformation of the inserted reinforcement to virtually any dimension, the original dimensions of the spacers being always the same for a respective greater range of the wall thickness of the casting-resin body. Other features which are considered as characteristic for the invention are set forth in the appended claims.

Although the invention is illustrated and described herein as embodied in method of manufacturing transformer windings embedded in casting resin, it is nevertheless not intended to be limited to the details shown, since various modifications and structural changes may be made therein without departing from the spirit of the invention and within the scope and range of equivalents of the claims.

BRIEF DESCRIPTION OF THE DRAWING

The construction and method of operation of the invention, however, together with additional objects and advantages thereof will be best understood from the following description of specific embodiments when read in connection with the accompanying drawings, in which.

DESCRIPTION OF THE PREFERRED EMBODIMENT

Figure 1:
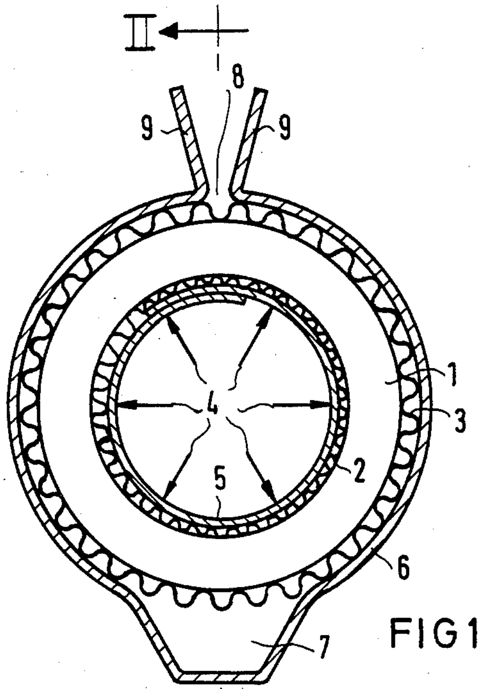
FIG. 1 is a cross-sectional view of a transformer winding manufactured in accordance with the method of the invention.
Figure 2:
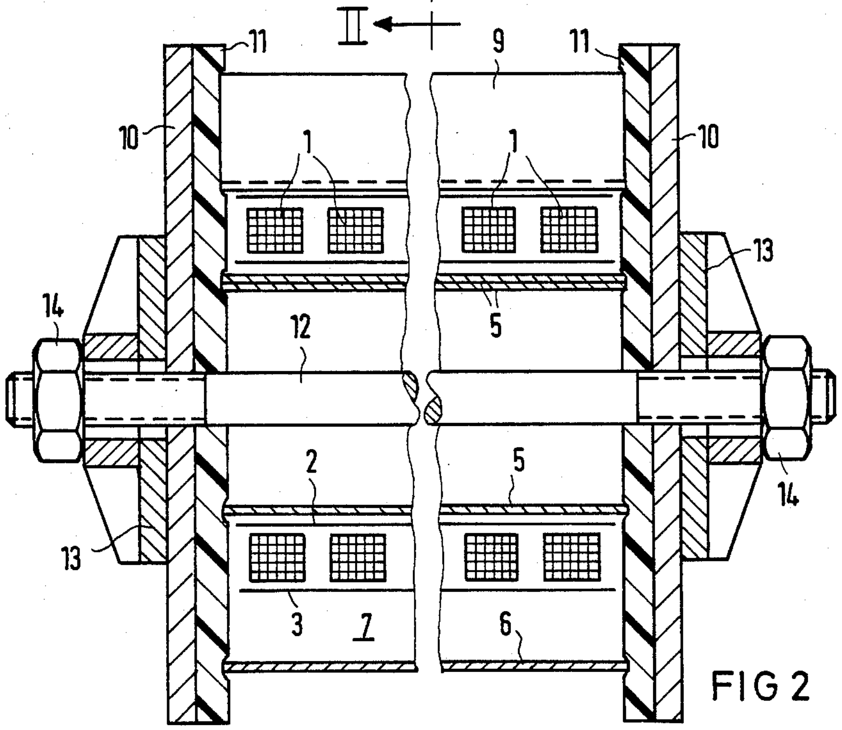
FIG. 2 is an axially-parallel longitudinal sectional view of the transformer winding of FIG. 1 disposed in a casting mold.

Referring now to the drawing and, first, particularly to FIG. 1 thereof there are shown coils 1 for a transformer winding, for example, a high voltage winding, wound individually and independently of one another on special equipment in a conventional manner. All of the coils 1, which are to be embedded in a common casting resin block, are disposed in radial direction between an inner spacer 2 and an outer spacer 3. The spacers 2 and 3 are formed, in turn, of woven or fleece mats of glass or epoxy resin and are corrugated in a manner similar top corrugated paper or cardboard. Normally, the corrugations extend parallel to the axis of the transformer winding, and the height of reach of the corrugations is approximately equal to the length of each of the corrugations.

At the inside of the inner spacer 2, an inner jacket 5 of a casting mold is pressed in the direction of the arrows 4. The pressure required therefor is transmitted in a conventional manner to the inner jacket 5 by non-illustrated strips shifted or slid on cones on inclined planes or other devices. To reduce friction and to prevent jamming in circumferential direction, balls or rolls are provided on the non-illustrated strips, along the contact lines with the inner jacket 5.

The inner jacket 5, while deforming the inner spacer 2, is spread apart independently of diameter tolerances to such an extent that the thickness of the gap to be filled with casting resin just withstands the electrical and/or mechanical stressing expected from the casting-resin plastic material during operation. Starting therefrom, the dimensioning or design of the inner spacer 2 takes the anticipated mechanical load into account beforehand.

For low overall electrical stresses of the casting resin plastic material and simultaneously high mechanical stresses, fiber bundles oriented parallel to the axis are inserted into all or some of the corrugations for additionally reinforcing the casting resin body so as to control the mechanical stresses. A further reinforcement of the casting-resin body is obtained by winding bundles of fibers into the ring-shaped chambers which are enclosed by the coils 1 in axial direction and by the spacers 2 and 3 in radial direction. Finally, non-illustrated tapes or bands which are disposed also on the outside around the outer spacer 3, contribute to an increase in the mechanical strength of the casting resin body in circumferential direction. By means of these non-illustrated bands, it is possible also to adjust the thickness of the gap which is held open by the outer spacer 3, independently of diameter tolerances at the coils 1.

An outer jacket 6 of a casting mold is placed around the winding arrangement of the coils 1, the inner spacer 2 spread out against the coil arrangement 1 from the inside, and the inner jacket 5 as well as the outer spacer 3 banded from the outside around the coils 1 and rests primarily against the corrugations of the outer spacer 3 as well as against the bands surrounding the latter. A bulge 7 parallel to the axis is provided in the outer jacket and forms a reinforcement in the casting resin body for receiving winding leads and terminal contacts. Diametrically opposite the bulge 7, a slot 8 is provided in the outer jacket 6 which is flanked by wall strips 9 angled away in an approximately radial direction and which serves as a venting and pouring opening for the casting mold.

The end faces of the casting mold are closed by mold walls 10 having respective sides thereof facing the inner jacket 5 and the outer jacket 6 covered with a layer 11 of elastic material.

The end-facing mold walls 10 and the respective elastic layers 11 are pressed by a respective anchor plate 13 so intensely against the end-base edges of the inner jacket 5 and the outer jacket 6 that the edges thereof are pressed into the elastic layers 11. The compressive force required for the anchor plates 13 is supplied by tightening nuts 14 on a tie rod 12.

The arrangement of the coils 1, the inner spacer 2 and the outer spacer 3 embedded in the casting mold formed of the inner jacket 5, the outer jacket 6 as well as the end-face mold walls 10 is evacuated in a non-illustrated chamber to nearly perfect vacuum and is then filled with pure epoxy resin or with an epoxy resin mixture containing up to 75% quartz powder poured into it. Depending upon the conditions prevailing, the mold, the coil 1 and/or the casting compound are preheated.

Subsequent to the filling of the casting mold with casting compound, the latter is subjected to atmospheric or higher pressure so that excess casting compound present in the funnel or hopper formed by the wall strips 9 is forced into the casting mold until the casting resin body is completely solidified.

There are claimed:

1. Method for manufacturing a transformer winding embedded in casting resin by winding coils, respectively by themselves and independently of one another for disposition thereof in tandem in axial direction of the winding; placing the wound coils in a substantially annular casting mold having an inner and an outer jacket, with respective impregnated corrugated mats of insulating material as spacers disposed between the inner jacket and the coils as well as between the coils and the outer jacket, the inner and the outer jackets being fixed between mold end walls at respective ends of the casting mold; disposing the casting mold containing the wound coils in an evacuated chamber and pouring casting resin into the casting mold through an axially parallel slot formed in the outer jacket thereof; and permitting the casting resin to harden at least partly in the mold at elevated temperature and at a pressure at least equal to atmospheric pressure; which comprises spreading the inner jacket of the casting mold in radial direction so as to permanently deform the inner spacer to a dimension at which the radical extent of the inner spacer is reduced, the inner jacket being formed with axially parallel edges at ends thereof overlapping in circumferential direction and slidable on one another during the deformation so as to spread the inner jacket in radial direction, fixing the coils of the winding on the inner spacer against movement in axial direction; and surrounding respective edges at the end of the inner and the outer jackets with an elastic layer at the inner face of the respective mold end walls.

2. Method according to claim 1 which includes forming the respective spacers of two layers of the mats of insulating material, one of the layers having corrugation folds extending in a direction which is +45° with respect to the axis of the winding, and the other of the layers having corrugation folds extending in a direction −45° with respect to the axis of the winding, so that the corrugation folds of both layers intersect at an angle of 90°.

3. Method according to claim 1 which includes extending the spacers beyond both ends of the winding in axial direction.

4. Method according to claim 1 which includes inserting bundles of fibers extending in circumferential direction in chambers defined by and between the coils and the spacers while slowly rotating the winding.

5. Method according to claim 1 which includes inserting bundles of fibers in the axially parallel corrugations of the spacers for additionally reinforcing the hardened casting resin.

6. Method according to claim 1 wherein the mats are woven or fleece and are formed of glass or synthetic fibers impregnated with pure casting resin.

7. Method according to claim 1 which includes impregnating the mats with casting resin only after the unimpregnated mats are first inserted into the casting mold.

8. Method according to claim 1 wherein the casting resin consists of pure epoxy resin or epoxy resin filled with quartz powder.

9. Method according to claim 1 which comprises preheating the casting mold.

10. Method according to claim 1 which comprises preheating the winding.

11. Method according to claim 1 which comprises sliding the coils over the inner jacket of the casting mold, and drawing the inner spacer from a magazine into the mold between the end edges of the inner jacket overlapping in circumferential direction and into installed position of the inner spacer while holding the coils fixed and slowly rotating the inner jacket.

* * * * *